June 24, 1952 L. B. EATON 2,601,376
APPARATUS FOR CONVEYING PACKAGES
Filed May 22, 1947 5 Sheets-Sheet 3

INVENTOR.
Lewis B. Eaton
BY J. Stanley Churchill
ATTORNEY

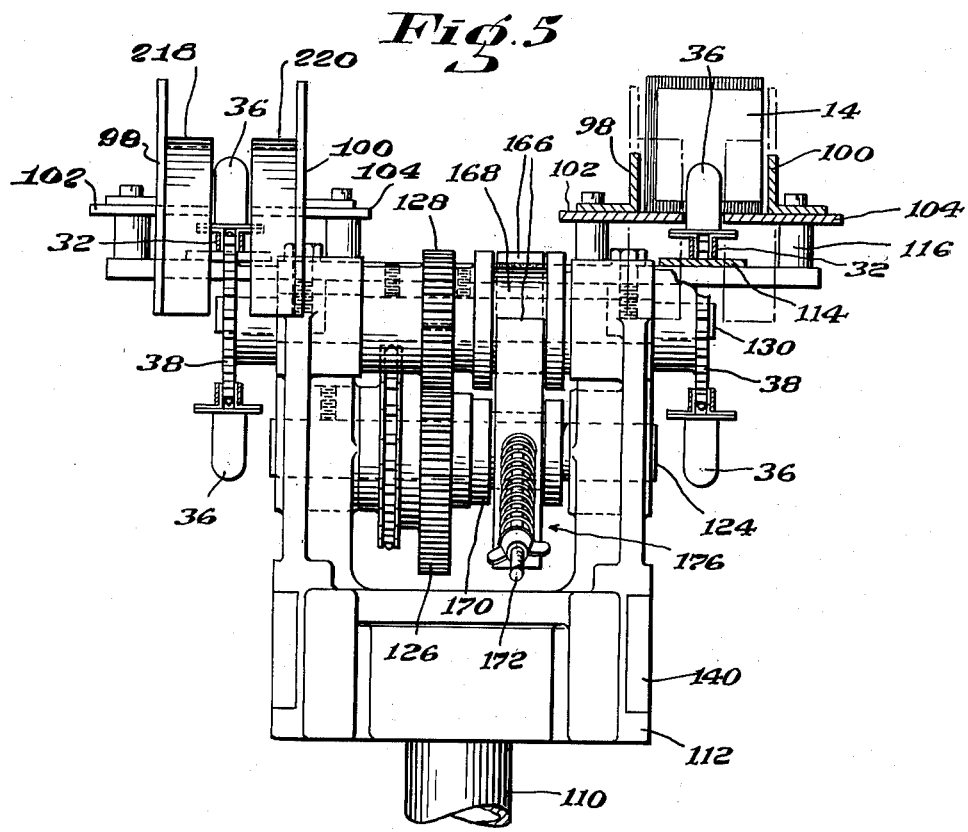

INVENTOR.
Lewis B. Eaton
BY
J. Stanley Churchill
ATTORNEY

Patented June 24, 1952

2,601,376

UNITED STATES PATENT OFFICE 2,601,376

APPARATUS FOR CONVEYING PACKAGES

Lewis B. Eaton, Quincy, Mass., assignor to Pneumatic Scale Corporation, Limited, Quincy, Mass., a corporation of Massachusetts Application May 22, 1947, Serial No. 749,710

4 Claims. (Cl. 198—134)

This invention relates to apparatus for conveying individual packages, preferably infusion bags of the envelope or pillow type.

The invention has for an object to provide novel and improved apparatus for conveying packages of the character specified in which novel provision is made for accumulating and stacking the same in spaced groups as they are produced, and preferably on edge and in groups of predetermined numbers, whereby successive groups may be conveniently withdrawn from the apparatus to be packed into the containers in which they are sold.

With this general object in view, and such others as may hereinafter appear, the invention consists in the apparatus for conveying bags, in the novel accumulating and stacking apparatus, and in the various structures, arrangements and combinations of parts hereinafter described and particularly defined in the claims at the end of this specification.

Figure 1:
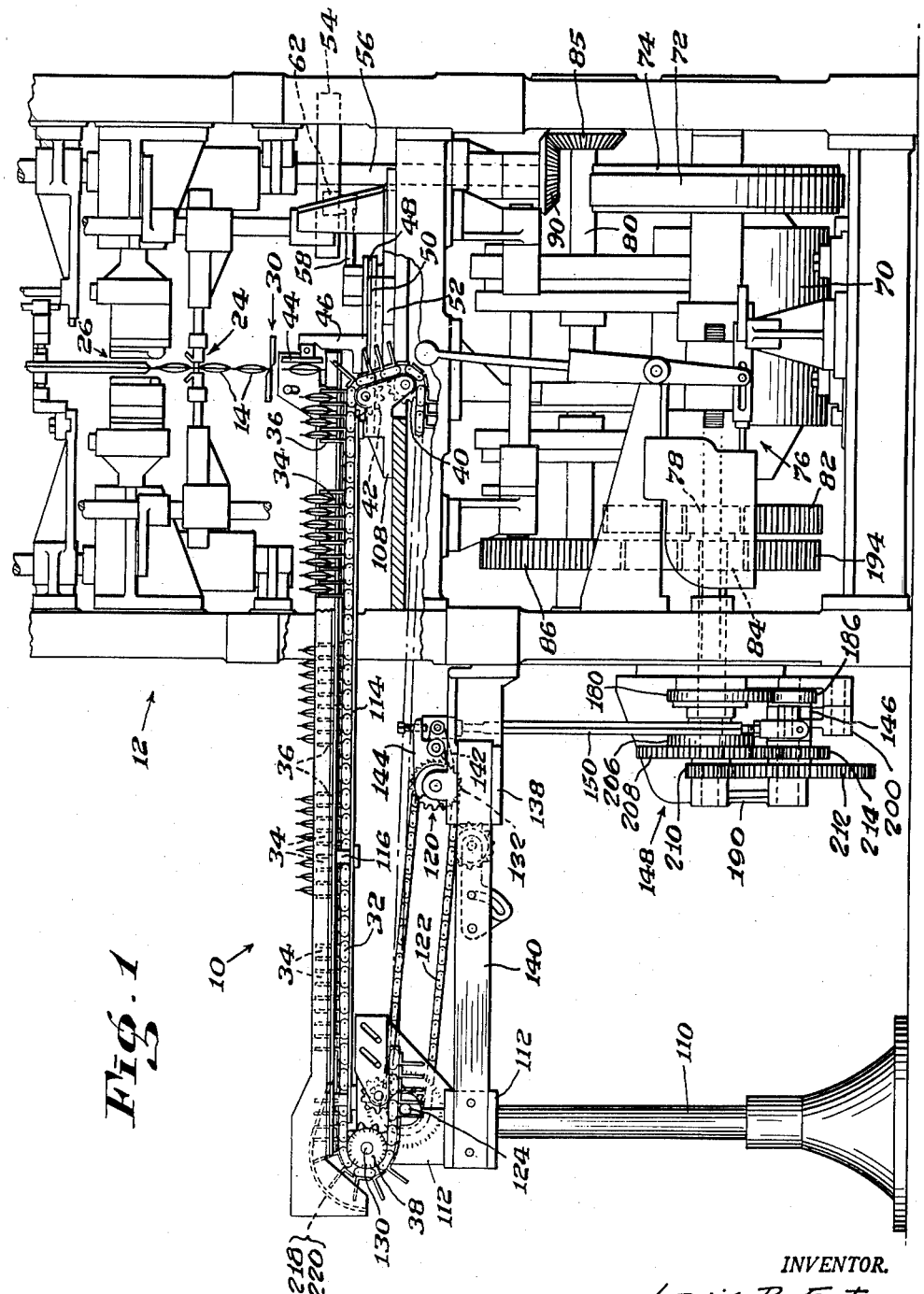
Figure 2:
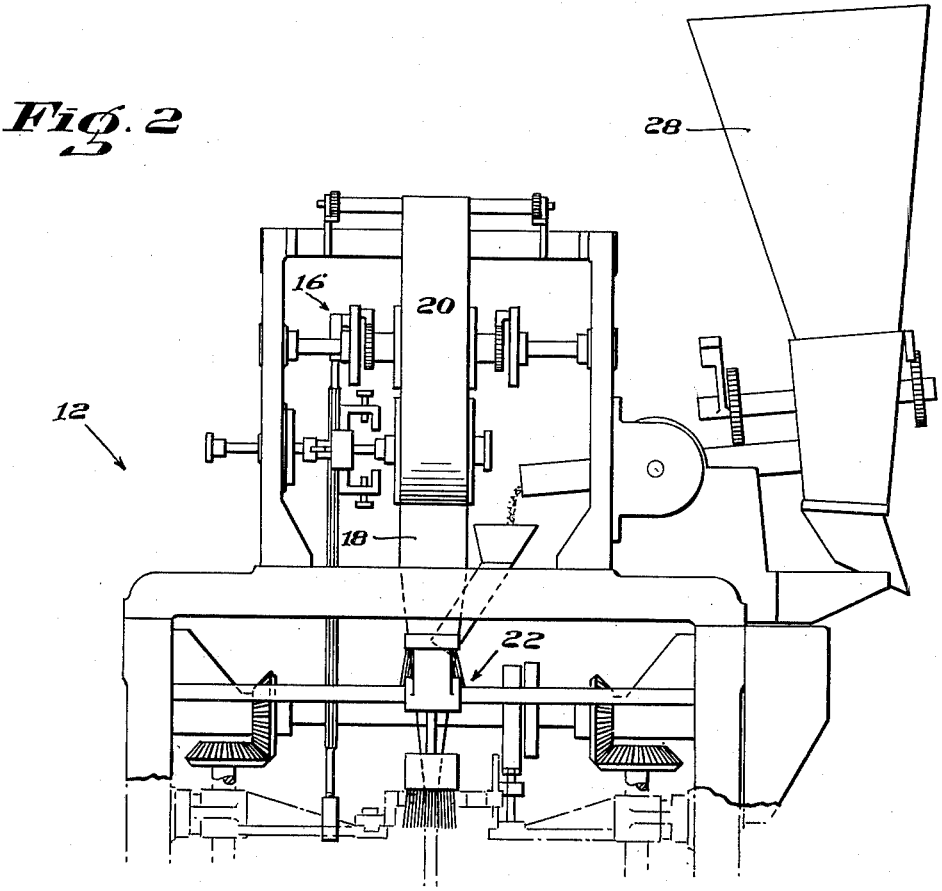
Figure 3:
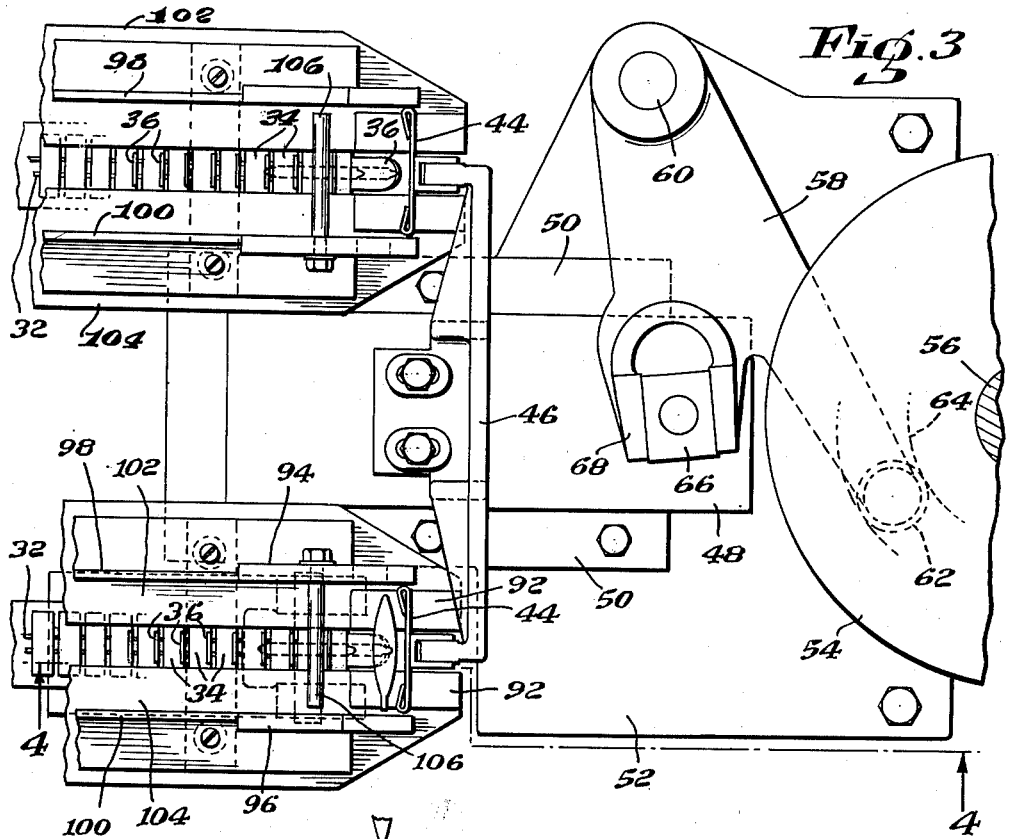
Figure 4:
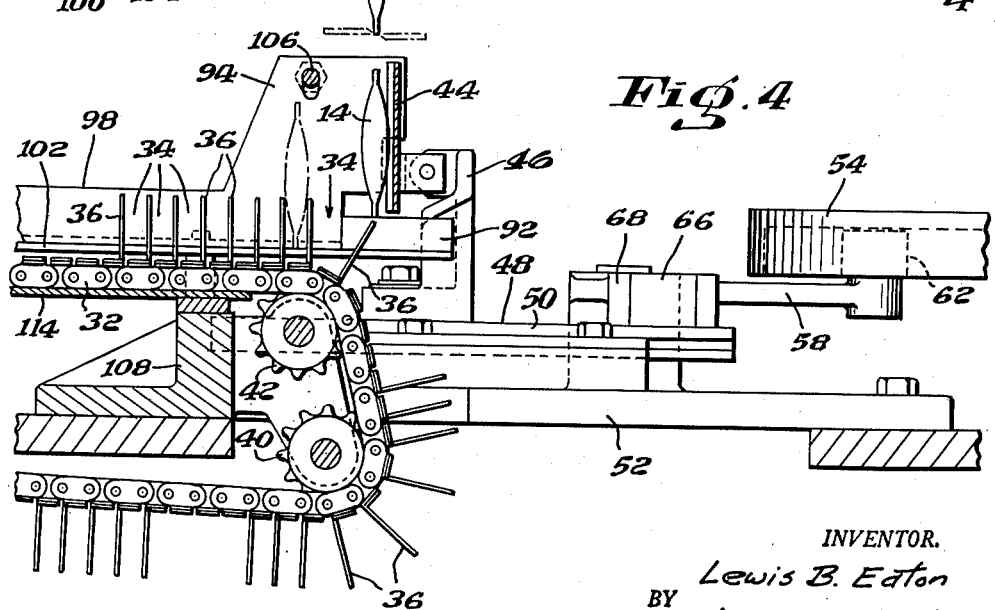
Figure 8:
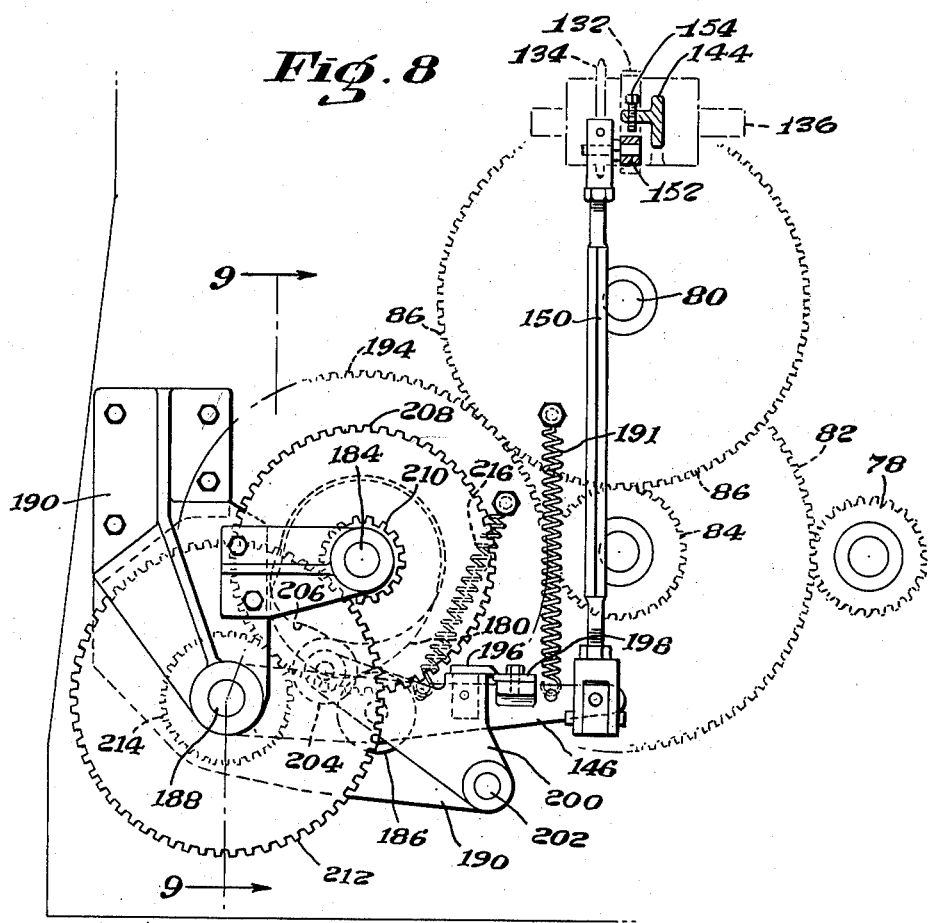
Figure 9:
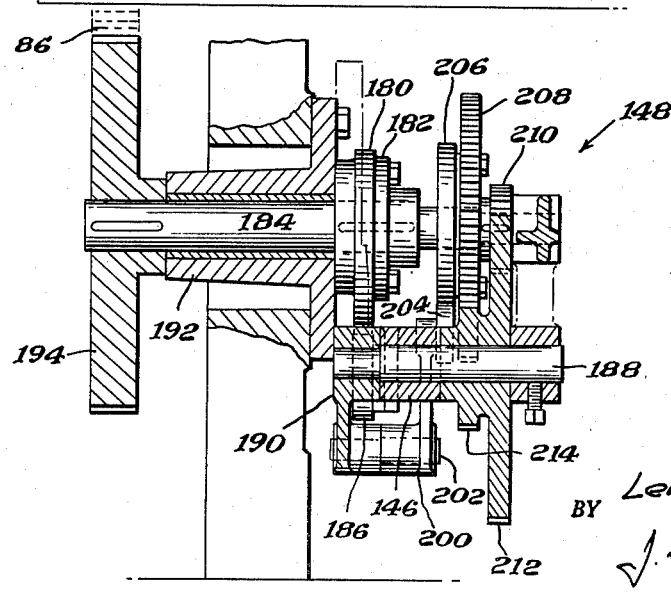

In the drawings illustrating the preferred embodiment of the invention, Fig. 1 is a front elevation of apparatus for conveying bags embodying the present invention; Fig. 2 is a similar view of a continuation of the upper portion of the apparatus shown in Fig. 1; Fig. 3 is a plan view of the receiving end of the accumulating and stacking apparatus shown in Fig. 1 and illustrating the bag transferring mechanism; Fig. 4 is a cross sectional view taken on the line 4—4 of Fig. 3; Fig. 5 is a front elevation of the delivery end of the accumulating and stacking apparatus; Fig. 6 is a detail view in side elevation of the intermittent driving mechanism indicated generally in Fig. 1; Fig. 7 is a plan view detail of the mechanism shown at the right hand side of Fig. 6; Fig. 8 is of front elevation of the driving mechanism illustrated in Fig. 1; and Fig. 9 is a cross sectional view of the same taken on the line 9—9 of Fig. 8.

In general, the present invention contemplates apparatus for automatically conveying bags, and preferably infusion bags of the envelope or pillow type and in which novel provision is made for receiving the individual bags as they are produced and for segregating or accumulating the same to provide spaced groups of bags preferably of equal number and preferably stacked edgewise for the convenience of the packer to permit the latter to conveniently withdraw successive groups as they are delivered from the apparatus and insert them into the containers in which they are to be shipped and marketed.

The present segregating or accumulating mechanism is herein shown as embodied in a tea bagging machine of the type illustrated and described in the United States Patent No. 2,385,229 issued to William S. Patterson, September 18, 1945 in which provision is made for folding an elongated web longitudinally and sealing the same transversely and along the infolded longitudinal edge to form a bag section, and then filling the bag section through the open top. Thereupon, in the operation of the machine, the strip is intermittently advanced one bag length and a succeeding and similar sealing operation closes the top of the filled bag section and forms a succeeding connected bag section. The bags thus formed are advanced to bag severing mechanism which operates to sever the strip through successive transverse sealed portions to form individual sealed bags.

In accordance with the present invention successive bags thus severed from the strip are arranged to be transferred into the present segregating apparatus which operates to stack successive bags preferably on edge in spaced groups of predetermined and preferably equal number and to deliver them from the machine. The segregating apparatus is illustrated herein as embodied in a duplex type of bag forming machine having provision for forming two strips of connected bag sections simultaneously, and, the present apparatus is likewise arranged in duplex form to receive each of the two sets of bags transferred from said strips during the operation of the apparatus. Furthermore, the illustrated segregating or accumulating apparatus is arranged to be driven from and operated in timed relation to the bag forming apparatus, thus providing a unitary bag forming and segregating machine for counting and stacking the individual bags in groups of predetermined and preferably equal number and for delivering them from the machine.

Referring now to the drawings, the present segregating apparatus, indicated generally at 10, is herein illustrated as embodied in a bag making machine indicated generally at 12 in which provision is made for forming a series of connected filled and sealed bag sections 14 in strip form. In general, the bag forming and filling machine is provided with web withdrawing mechanism, indicated generally at 16, arranged to withdraw a predetermined length or web of bag forming material 18 from a supply roll 20 thereof. The bag forming material preferably comprises a porous fibrous material containing a thermoplastic, pressure responsive, binding material so that when two layers or plies of the material are brought together and subjected to the application of heat and pressure, they will become and remain adhesively united. The web of bag forming material 18 is advanced past bag forming mechanism, indicated generally at 22, which operates to fold the web longitudinally along a medial line to bring together the two half sections of the web preparatory to forming a strip of connected bags. The bag forming material is drawn over the bag forming mechanism 22 by gripping and advancing mechanism indicated generally at 24 operative to advance the strip one bag length each cycle of operation of the machine and to present the strip in operative relation to bag sealing mechanism 26 arranged to simultaneously seal the strip along a transverse and an adjacent longitudinal zone during each sealing operation to form a succession of connected bag sections, closed on one side by the folded edge, and heat sealed along the opposite edge, and along spaced transverse portions.

Upon sealing a bag section along transverse and longitudinal zones as above described, provision is made for introducing a predetermined amount of the commodity such as tea, through the open edge of the web and between the fold of a partially formed bag section. The bag filling mechanism, indicated generally at 28, is operative to deposit successive charges of the commodity into successive bag sections in timed relation to the operation of the strip advancing and heat sealing mechanisms, and, in the operation of the machine, the open top of a bag which has been provided with a charge of the commodity during one cycle of operation, is closed during a succeeding cycle. The heat sealing and bag filling mechanisms are preferably timed to operate and seal the bottom and side of the bag immediately prior to the operation of filling the bag. Thereupon, the strip is intermittently advanced to bag severing mechanism herein shown as comprising shears indicated generally at 30 which operate to sever the strip through successive transverse sealed portions to form individual filled and sealed bags. For a further and more detailed description of the construction and mode of operation of the bag making apparatus reference is made to the United States Patent No. 2,385,229 to William S. Patterson, September 19, 1945.

In the illustrated embodiment of the invention, successive individual filled and sealed bags thus severed from the two strips produced by the duplex bag making machine are arranged to be transferred directly into the duplicate accumulating mechanisms 10 each of which as herein shown comprises an intermittently operated conveyor having a carrier chain 32 provided with a plurality of spaced groups of pockets 34 formed by spaced pusher plates 36 attached to and movable with the carrier chain. As herein shown, the carrier chain 32 is arranged to run over a driving sprocket 38 disposed at the delivery end of the apparatus, and a guide sprocket 40 and driven sprocket 42 disposed at the receiving end of the apparatus.

In the operation of the machine, successive bags 14 are transferred into successive pockets 34 of each carrier chain 32 at the receiving end of the apparatus by reciprocatory transfer plates 44 carried by and movable with a bracket 46 adjustably attached to a slide member 48. The slide member 48 is mounted to slide between guides 50 secured to a bracket 52 attached to the machine frame, and, the duplex transfer mechanism is arranged to be reciprocated in timed relation to the intermittent movement of the carrier chains by a cam 54 fast on a vertical cam shaft 56 of the bag making machine. A cooperating cam lever 58 pivotally mounted at 60 in the extended bracket 52 is provided with a roller 62 arranged to travel in the cam path 64 of the cam, and, the lever 58 is operatively connected to the slide member 48 by a swivel block connection 66 carried by the slide and a cooperating yoke shaped extension 68 from the lever arranged to slidingly embrace the swivel block, as clearly shown in Fig. 3.

As herein shown, the vertical cam shaft 56, forming a part of the bag forming machine, is arranged to be driven from a motor 70 connected by a belt 72 to a pulley 74 forming a part of a clutch mechanism, indicated generally at 76, and arranged to be engaged to drive a pinion 78 upon engagement of the clutch. The pinion 78 is arranged to drive a horizontal cam shaft 80 of the bag forming machine through a gear train 82, 84, 86, the latter being fast on the cam shaft 80, and, the vertical cam shaft 56 is connected to the cam shaft 80 by cooperating bevel gears 88, 90, as shown in Fig. 1.

From the description thus far it will be observed that in the operation of the apparatus, successive bag sections 14 as they are severed from the strips are engaged by the reciprocatory transfer plates 44 and deposited into successive pockets 34 of the intermittently movable carrier chains 32. As best shown in Fig. 4, upon severance of an endmost bag section 14 from a strip, the bag is permitted to fall a short distance in an upright position onto spaced elevated blocks 92 and directly in front of a transfer plate 44, the bag being supported laterally along its vertical edges by extended portions 94, 96 of the conveyer guide rails 98, 100. Thereupon, the bag section 14 is immediately pushed forward by the reciprocatory plate 44 to drop off the forward edge of the elevated blocks 92 into an adjacent pocket 34, with the bag still maintained in an upright position and the lower edge of the bag resting on spaced elongated stationary rails 102, 104 defining the bottom of the pockets 34 and along which the bags are advanced during the intermittent movement of the carrier chain.

In the operation of the apparatus the bag is transferred into a pocket 34 during the idle period of the intermittently operated carrier chain, and, the pocket 34 into which the bag is deposited is maintained in a spread apart or open position during the transfer operation by the radial extension of the trailing pusher plate 36 in passing around the sprocket 42. In order to maintain the bag in an upright position during the transfer operation, a cross rod 106 may be provided which is extended from the guide rail 94 and disposed in a position to engage the upper edge of the bag as it is pushed forward to prevent the bag from tipping, the lower edge of the bag being engaged by the upper end of the adjacent pusher plate 36 whereupon the bag will drop in a vertical position to rest on the stationary rails 102, 104 and in back of the adjacent pusher plate forming the front wall of the pocket. Immediately thereafter the intermittently operated conveyer is moved a distance of one pocket space at which time the trailing pusher plate 36, forming the rear wall of the pocket, is moved up into a vertical position to support the back of the bag and to present a succeeding open pocket into operative position to receive the succeeding bag section.

In the continued operation of the machine, successive pockets are intermittently advanced along the stationary rails and supported in a vertical or upright position by the pusher plates 36, the bags being laterally supported by the guide rails 98, 100 of the conveyer. As herein shown, the conveyer is supported at its inner end by a bracket 108 attached to the machine frame and at its outer end by a floor stand 110 provided with a bracket 112. The upper run of the carrier chain 32 is supported by an elongated tie rail 114 attached to and extending between the brackets 108, 112. The spaced rails 102, 104 on which the bags rest and between which the pusher plates are extended are supported from the tie rail 114 by spacing members 116 arranged to dispose the rails 102, 104 in an elevated position, as best shown in Fig. 5, and, the guide rails 98, 100, herein shown as comprising angle bars, are adjustably supported on top of the rails 102, 104 as illustrated.

As above described, the accumulating conveyer 10 is intermittently operated in timed relation to the severance and transfer of successive bag sections thereto and in the operation of the apparatus, the carrier chain 32 is arranged to be advanced a distance of one pocket space each cycle of operation for a predetermined number of cycles, herein shown as eight, and when the last pocket 34 of a group is provided with a bag section, the carrier chain is arranged to be moved a relatively greater distance corresponding to the distance between successive groups, the latter movement being made in the same time cycle as a single pocket space movement so that the succeeding bag transferred to the conveyer will be received in the first pocket of the succeeding group of pockets.

The above described operation of the accumulating conveyer is herein shown as being effected through intermittent driving mechanism operatively connected to the bag making machine and which includes a pawl and ratchet mechanism, indicated generally at 120, connected by a chain and sprocket drive 122 to an intermediate shaft 124 journaled in the bracket 112 and provided with a gear 126 arranged to mesh with a pinion 128 fast on the shaft 130 also journaled in the bracket 112 and on which the conveyor driving sprockets 38 are mounted. As best shown in Figs. 6 and 7, the pawl and ratchet mechanism 120 includes a ratchet 132 which may be formed integrally with the sprocket 134 of the chain and sprocket drive and which is rotatably mounted on a short shaft 136 fixed in a supporting bracket 138 attached to the machine frame. The supporting bracket 138 is also connected by tie pieces 140 to the floor stand bracket 112, as illustrated. A cooperating pawl 142 is pivotally carried by a pawl carrier 144 rockingly mounted on the shaft 136, and, the pawl carrier is arranged to be rocked to effect engagement of the pawl and rotation of the ratchet by a cam operated lever 146 forming a part of the driving mechanism indicated generally at 148, as shown in Fig. 1, the lever 146 being connected to the pawl and ratchet mechanism by a rod 150 swively connected to an extended arm 152 of the pivotally mounted pawl 142.

In the operation of the device, when the rod 150 is elevated, the pawl 142 is first rocked on its pivot 143 out of engagement with the ratchet 132 whereupon the extended arm 152 is arranged to engage a stop screw 154 adjustably carried by the pawl carrier 144 to effect upward rocking of the latter on the shaft 136. Likewise, upon initial downward movement of the rod 150, the pawl 142 is first rocked into engagement with the ratchet 132, and, upon continued downward movement the ratchet is rotated a predetermined distance to effect movement of the carrier chain.

In order to permit relative rotary movement between the pawl carrier 144 and the integral sprocket and ratchet unit 132, 134 during the upward or return stroke and also to prevent overthrow during the downward or operating stroke of the rod 150, the sprocket and ratchet unit is provided with fibre friction discs 156 on both sides thereof which tend to maintain the unit in the position to which it is moved until positively engaged by the pawl 142 during a succeeding cycle of operation. As herein shown, a spring pressed pressure disc 158 carried by the pawl carrier hub may also be provided to permit the pressure against the friction discs to be varied. The pressure disc 158 is provided with a pin 160 extended into a bore in the pawl carrier hub and a spring 162 is interposed between the pin 160 and an adjusting screw 164 provided in the other end of the bore, as clearly shown in Fig. 7.

Provision is also made in the preferred embodiment of the invention for preventing overthrow of the carrier chain driving sprockets 38 during intermittent rotation thereof, and, for this purpose a friction brake may be provided which, as herein shown, comprises a pair of opposed, leather faced brake shoes 166 arranged to embrace a drum 168 fixed to the shaft 130, the extended portions of the brake shoes being received in a grooved roller 170 mounted on the intermediate shaft 124. The brake shoes 166 are adjustably maintained in operative position by a brake rod 172 extending therethrough and having a T-head portion 174 on one side and a spring and thumb nut connection 176 on the other side, as clearly shown in Fig. 6.

Referring now to Figs. 8 and 9, the cam lever 146 is arranged to be rocked through a relatively small arc to effect movement of the carrier chain 32 a distance corresponding to one pocket space for a pretermined number of cycles of operation by a cam 180 adjustably mounted on a disc 182 keyed to a short cam shaft 184, and, by a cooperating cam roller 186 carried by the lever 146. As herein shown, the cam operated lever 146 is pivotally mounted on a stud 188 fast in a supporting bracket 190 attached to the machine frame and the lever 146 is yieldingly urged upwardly by a spring 191. The cam shaft 184 is journaled in a bearing member 192 secured to the machine frame and is arranged to be rotated in timed relation to the operation of the bag making machine by the gear 86 fast on the horizontal cam shaft 80 and which is arranged to mesh with a similar gear 194 fast on the short cam shaft 184.

As herein illustrated, the cam operated lever 146 is arranged to be checked or limited in its upward movement for a predetermined number of successive cycles by a cam operated latch 196 arranged to engage a latch plate 198 attached to the lever 146. The latch 196 is carried by an arm 200 pivotally mounted on a stud 202 fast in the supporting bracket 190, and, is provided with a cam roller 204 arranged to cooperate with a cam 206 adjustably secured to a gear 208 loosely mounted on the cam shaft 184. The cam 206 is arranged to be rotated at a reduced speed to effect rocking of the arm 200 and release of the latch after a predetermined number of cycles to permit the lever 146 to be rocked through a relatively greater arc thus operating the pawl and ratchet drive to effect movement of the carrier chain 32 a distance corresponding to the space between adjacent groups of pockets. As herein shown, this movement is effected by the provision of a train of speed reducing gears including a pinion 210 fast on the cam shaft 184, a cooperating idler gear 212 loosely mounted on the stud 188, and a pinion 214 formed integrally with the gear 212 and arranged to mesh with the gear 208 to which the cam 206 is secured. The arm 200 is urged in a direction to cooperate with the cam 206 by a spring 216.

In the operation of the illustrated apparatus, the carrier chain 32 is advanced one pocket space by rotation of the ratchet 132 a distance of one tooth, as indicated in Fig. 6 by the full line position of the pawl 142 and the lower dotted line position of the same. In the upper dotted line position of the pawl is herein shown as engaged to rotate the ratchet a distance of five teeth to effect advancement of the carrier chain a distance corresponding to the space between adjacent groups.

From the description thus far it will be observed that the present apparatus is capable of accumulating a predetermined number of successive bags, herein shown as eight, and, of segregating the bags into separated groups for the convenience of the packer who may withdraw successive groups as they are advanced along the conveyer and place them in a container for shipment. It will also be observed that the illustrated apparatus may be employed with advantage in the packing of tea bags, in accordance with the present standard practice, in containers of eight or in multiples of eight bags. However, the present apparatus may be adapted for segregating the bags into groups of a different number by merely changing the carrier chain to provide the number of pockets desired and replacing the speed reducing train of gears 208, 210, 212, 214 with a different set of gears to provide a corresponding control of the pawl and ratchet driving mechanism. While the preferred mechanism has been herein shown for effecting the foregoing results, other means may be employed for this purpose.

An important advantage of the present apparatus lies in the opportunity afforded the packer of inspecting the groups of bags to detect tears or other imperfections, the bags being spaced to enable inspection of the upper portions of the bags as they are advanced. In practice, the operator grasps the entire group by squeezing the upper or extended portions together to withdraw the bags from the pockets as a group. Since the tea or other commodity in the bags occupies the lower portion of each bag, when the bags are thus removed they are caused to spread apart or fan out radially so that the operator may inspect the lower half sections for any irregularities and replace those found defective before packing them in a container.

In the event that one or more bags is not withdrawn from the pockets by the operator provision is made for elevating the bags out of the pockets and for guiding the bags off the end of the conveyer from which they may drop into any suitable receptacle placed therebeneath, the bags being handled with minimum likelihood of damage thereto during the elevating and discharging movement. For this purpose, as shown in Figs. 1 and 5, the bags are arranged to ride up a pair of spaced curved rails 218, 220 as they approach the delivery end of the conveyer, the rails 218, 220 preferably being coextensive with the bottom supporting rails 102, 104 and being curved around the driving sprocket beyond the ends of the pusher or carrier plates 36, as illustrated. Thus, in operation, the bags are removed from the pockets and discharged from the conveyer without interference from the pusher plates as they pass around the driving sprocket 38.

While the preferred embodiment of the invention has been herein illustrated and described, it will be understood that the invention may be embodied in other forms within the scope of the following claims.

Having thus described the invention, what is claimed is:

1. In apparatus of the character described, in combination, an endless conveyer having a plurality of bag-receiving pockets arranged in groups of equal number and with a substantial space between successive groups, means for transferring successive bags from a source of supply into successive pockets, and driving means for intermittently advancing said conveyer a distance of one pocket space each cycle of operation for a predetermined number of cycles corresponding to the number of pockets in a group, and for then advancing the conveyer a relatively greater distance corresponding to the space between said groups during one cycle, said driving means including a cyclically operated member, stop means for limiting the movement of said member to effect successive movements of one pocket space, and means for rendering said stop means inoperative during said one cycle.

2. Segregating apparatus for segregating rectangular-shaped and substantially flat packages into spaced groups comprising an endless conveyer having a plurality of upstanding pocket-forming partitions arranged in groups of equal number and with a substantial space between successive groups, means for transferring successive packages from a supply into successive pockets, and driving means including a cyclically operated member, stop means for limiting the extent of movement of said member to effect intermittent advancement of said conveyer a distance of one pocket space for a predetermined number of cycles corresponding to the number of pockets in a group, and means for periodically removing said stop to permit the conveyer to be advanced a relatively greater distance corresponding to the space between successive groups.

3. In apparatus of the character described, in combination, a conveyer comprising a chain having a plurality of upstanding parallel pusher plates defining bag-receiving pockets arranged to support the bags on edge in an upright position, said pockets being arranged in groups of equal number with a substantial space between successive groups, means for supporting the chain including a sprocket over which the chain runs, said plates being arranged to spread out radially in going around the sprocket to effect opening of the pockets, means for transferring successive bags from a supply into successive open pockets adjacent the upper run of the chain, said plates being arranged to close upon successive bags upon subsequent movement of the chain, and driving means including a cyclically operated member, stop means for limiting the movement of said member to effect intermittent advancement of the conveyer a distance of one pocket space for a predetermined number of cycles corresponding to the number of pockets in a group, and means for thereafter removing said stop to permit the conveyer to be advanced a relatively greater distance corresponding to the space between successive groups during one cycle.

4. In apparatus of the character described, in combination, endless conveying means having a plurality of pockets arranged to receive successive bags, said pockets being arranged in groups and with a substantial space between successive groups, and driving means including a pawl and ratchet clutch, a cyclically operated rocker arm for operating said clutch, stop means for limiting the extent of movement of said arm to effect intermittent advancement of said conveyer a distance of one pocket space for a predetermined number of cycles corresponding to the number of pockets in a group, and means for thereafter removing said stop during one cycle to permit the conveyer to be advanced a relatively greater distance corresponding to the space between successive groups whereby to effect segregation of the bags on the conveyer in spaced groups of equal number.

LEWIS B. EATON.

REFERENCES CITED

The following references are of record in the file of this patent:

UNITED STATES PATENTS

| Number | Name | Date |
|---|---|---|
| 199,645 | Heeren | Jan. 29, 1878 |
| 1,111,549 | Staffel | Sept. 22, 1914 |
| 1,150,302 | Perkins | Aug. 17, 1915 |
| 1,181,090 | Winkley | Apr. 25, 1916 |
| 1,221,196 | Lewis | Apr. 3, 1917 |
| 1,519,354 | Brown | Dec. 16, 1924 |
| 1,599,553 | Claremont | Sept. 14, 1926 |
| 1,625,461 | Files | Apr. 19, 1927 |
| 1,815,372 | Frazier | July 21, 1931 |
| 2,006,091 | Walter | June 25, 1935 |

FOREIGN PATENTS

| Number | Country | Date |
|---|---|---|
| 413,553 | Great Britain | July 19, 1934 |